(12) United States Patent
Pihko et al.

(10) Patent No.: US 11,105,045 B2
(45) Date of Patent: Aug. 31, 2021

(54) METHOD FOR THE PRODUCTION OF A FILM COMPRISING MICROFIBRILLATED CELLULOSE, A FILM AND A PAPER OR PAPERBOARD PRODUCT

(71) Applicant: Stora Enso OYJ, Helsinki (FI)

(72) Inventors: Riku Pihko, Jyväskylä (FI); Vesa Kunnari, Tuusula (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/337,130

(22) PCT Filed: Sep. 27, 2017

(86) PCT No.: PCT/IB2017/055880
§ 371 (c)(1),
(2) Date: Mar. 27, 2019

(87) PCT Pub. No.: WO2018/060868
PCT Pub. Date: Apr. 5, 2018

(65) Prior Publication Data
US 2019/0226146 A1 Jul. 25, 2019

(30) Foreign Application Priority Data
Sep. 28, 2016 (SE) .................... 1651272-5

(51) Int. Cl.
*D21H 11/18* (2006.01)
*D21F 5/00* (2006.01)
(Continued)

(52) U.S. Cl.
CPC ............. *D21H 11/18* (2013.01); *C08B 15/02* (2013.01); *C08J 5/18* (2013.01); *C08L 1/02* (2013.01);
(Continued)

(58) Field of Classification Search
CPC ........ D21H 11/18; D21H 19/34; D21H 27/30; D21H 19/00; D21H 19/10; D21H 27/38;
(Continued)

(56) References Cited

U.S. PATENT DOCUMENTS 8,663,425 B2   3/2014  Noishiki et al.
9,175,441 B2 * 11/2015  Heiskanen ............. D21H 19/18
(Continued)

FOREIGN PATENT DOCUMENTS

CN   102264821 A   11/2011
CN   102575430 A    7/2012
(Continued)

OTHER PUBLICATIONS

Aulin et al., in "Oxygen and oil barrier properties of microfibrillated cellulose films and coatings" Cellulose, Vo. 17, pp. 559-574 (Year: 2010).*

(Continued)

*Primary Examiner* — Jose A Fortuna
(74) *Attorney, Agent, or Firm* — Greer, Burns & Crain, Ltd.

(57) ABSTRACT

The present invention relates to a method for the production of a film comprising microfibrillated cellulose, wherein the method comprises the steps of; providing a suspension comprising between 70 weight-% to 100 weight-% of microfibrillated cellulose based on total dry weight, forming a fibrous web of said suspension, drying the web in a drying equipment wherein the web is at least partly dried at a drying rate above 75 kg($H_2O$)/m$^2$/h by use of hot air whereby a film is formed. The invention also relates to a film produce according to the method and a paper or paperboard substrate comprising said film.

15 Claims, 2 Drawing Sheets

(51) Int. Cl.
*D21F 5/18* (2006.01)
*D21H 19/00* (2006.01)
*C08L 1/02* (2006.01)
*C08J 5/18* (2006.01)
*C08B 15/02* (2006.01)

(52) U.S. Cl.
CPC ............... *D21F 5/004* (2013.01); *D21F 5/18* (2013.01); *D21H 19/00* (2013.01); *B32B 2307/7244* (2013.01); *C08J 2301/02* (2013.01)

(58) Field of Classification Search
CPC . C08J 5/18; C08J 2301/02; B32B 2307/7244; B32B 2307/718; C08L 1/02; C08L 2203/16; C08L 2201/14; D21F 11/00; D21F 5/004; D21F 5/18; B82Y 30/00; C08B 15/02
See application file for complete search history.

(56) References Cited

U.S. PATENT DOCUMENTS

| | | | | |
|---|---|---|---|---|
| 10,435,842 | B2* | 10/2019 | Heiskanen | ............... D21H 7/26 |
| 2010/0124651 | A1 | 5/2010 | Rousseau et al. | |
| 2011/0281487 | A1 | 11/2011 | Mukai et al. | |
| 2013/0209772 | A1 | 8/2013 | Sandström et al. | |
| 2014/0255688 | A1* | 9/2014 | Salminen | ............... B32B 5/02 428/339 |
| 2015/0191036 | A1 | 7/2015 | Ratnakumar et al. | |
| 2015/0322170 | A1* | 11/2015 | Haggblom | ............... C08B 15/02 536/56 |
| 2017/0342661 | A1* | 11/2017 | Aulin | ............... D21H 19/34 |
| 2018/0245289 | A1* | 8/2018 | Heiskanen | ............... D21H 11/18 |
| 2019/0048527 | A1* | 2/2019 | Heiskanen | ............... D21H 21/20 |
| 2019/0091982 | A1* | 3/2019 | Heiskanen | ............... B32B 27/08 |
| 2019/0226146 | A1* | 7/2019 | Pihko | ............... D21H 19/00 |
| 2019/0234020 | A1* | 8/2019 | Backfolk | ............... D21H 11/18 |
| 2019/0248988 | A1* | 8/2019 | Heiskanen | ............... C08K 5/0025 |
| 2019/0264394 | A1* | 8/2019 | Backfolk | ............... D21H 23/04 |
| 2019/0276621 | A1* | 9/2019 | Heiskanen | ............... D21H 13/00 |
| 2020/0010629 | A1* | 1/2020 | Backfolk | ............... C08L 1/02 |
| 2020/0023409 | A1* | 1/2020 | Axrup | ............... D21H 25/14 |
| 2020/0023627 | A1* | 1/2020 | Heiskanen | ............... B32B 29/02 |
| 2020/0086604 | A1* | 3/2020 | Land Hensdal | ........ B32B 27/32 |
| 2020/0173109 | A1* | 6/2020 | Saukkonen | ............... B32B 23/06 |
| 2020/0325626 | A1* | 10/2020 | Pihko | ............... D21H 11/18 |

FOREIGN PATENT DOCUMENTS

| | | | |
|---|---|---|---|
| CN | 103025956 A | 4/2013 | |
| CN | 104350203 A | 2/2015 | |
| EP | 2460934 A | 6/2012 | |
| EP | 2460934 A1 * | 6/2012 | ............. D21H 15/02 |
| EP | 2505604 | 10/2012 | |
| EP | 2505604 A1 * | 10/2012 | ............... C08K 3/34 |
| EP | 2532782 | 12/2012 | |
| EP | 2554589 | 2/2013 | |
| EP | 2554589 A1 * | 2/2013 | ............... C08K 3/36 |
| EP | 2897810 B1 * | 3/2017 | ............... C08K 5/19 |
| JP | 2006245550 A | 9/2006 | |
| JP | 2011132501 A | 7/2011 | |
| JP | 2011202101 A * | 10/2011 | |
| JP | 2011202101 A | 10/2011 | |
| JP | 2007231438 A | 9/2013 | |
| WO | 2011059398 | 5/2011 | |
| WO | 2014044870 A1 | 3/2014 | |
| WO | WO-2014091413 A1 * | 6/2014 | ............. D21F 11/00 |
| WO | WO-2017199157 A1 * | 11/2017 | ............. A61Q 17/04 |
| WO | WO-2018060868 A1 * | 4/2018 | ............. D21H 19/00 |

OTHER PUBLICATIONS

Lowys et al. in "Rheological characterization of cellulosic microfibril suspensions. Role of polymetric additives," Food Hydrocolloids, 15, pp. 25-32 (Year: 2001).*
Machine Translation of JP 2011202101 A (Year: 2011).*
International Searching Authority, Written Opinion of the International Searching Authority, PCT/IB2017/055880, dated Apr. 5, 2018.
International Searching Authority, International Search Report, PCT/IB2017/055880, dated Apr. 5, 2018.
Timofeev, O., et al., "Drying of Pigment-Cellulose Nanofibril Substrates," Materials, vol. 7, Oct. 2014, pp. 6893-6907.
Rajala, P., et al., "The Effect of the Impingement Air Drying on Print Mottle and Other Coated Paper Properties," Applied Thermal Engineering, vol. 24, Dec. 2004, pp. 2527-2536.
Syverud and Stenius, "Strength and Barrier Properties of MFC Films," Cellulose, vol. 16, Feb. 2009, pp. 75-85.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Extended European Search Report , PCT/IB2017/055880, dated Mar. 4, 2020.
Lowys M P et al: "Rheological characterization of cellulosic microfibril suspensions. Role of polymeric additives", Food Hydrocolloids, Elsevier BV, NL, vo 1-15, No. 1, Jan. 1, 2001.
Syverud, Kristin, Strength and barrier properties of MFC films, Cellulose (2009) 16:75-85.

* cited by examiner

METHOD FOR THE PRODUCTION OF A FILM COMPRISING MICROFIBRILLATED CELLULOSE, A FILM AND A PAPER OR PAPERBOARD PRODUCT

This application is a U.S. National Phase under 35 U.S.C. § 371 of International Application No. PCT/IB2017/055880, filed Sep. 27, 2017, which claims priority under 35 U.S.C. §§ 119 and 365 to Swedish Application No. 1651272-5, filed Sep. 28, 2016.

TECHNICAL FIELD

The present invention relates to a method for producing a film comprising microfibrillated cellulose, a microfibrillated film and a paper or paperboard product produced according to the method.

BACKGROUND

Films comprising microfibrillated cellulose (MFC) has been known to have good strength and oxygen barrier properties. This is for example described by Syverud, "Strength and barrier properties of MFC films", Cellulose 2009 16:75-85 where MFC films with a basis weight of between 15-30 gsm was produced and the strength and barrier properties was investigated.

During production of MFC films it is not easy to dewater and produce the film at high speed due to the characteristics properties of microfibrillated cellulose. When MFC films are used, for example, as barriers, it is crucial that the films don't have any pinholes or other defects that negatively would affect the barrier properties. Thus, it is important that the surface of the MFC film is smooth.

Wet laid techniques can be used for the production of MFC films, i.e. dewatering a furnish comprising said MFC on a wire. This method has the disadvantage that the MFC films will have wire marks on the surfaces which will negatively affect the barrier properties as well as the optical properties, such as gloss or translucency, of the films. The film is thereafter wet pressed which also will create a rough structure on the surfaces of the films as well as the technique has major problems with shrinkage of the films during drying. Calendering of the MFC films after production in conventional calenders in order to smoothen the surfaces using two or several hard nips has also been shown to be difficult due to the high density of the MFC films.

It is also possible to create smooth MFC films by using film casting methods, i.e. casting of the film on a plastic surface and then drying the film slowly. Casting methods have been shown to produce MFC films with very smooth surfaces with good barrier properties. However, the method is too slow and inefficient for production in commercial scale.

There is thus a need for a new method to create a MFC film with high smoothness and improved barrier properties.

SUMMARY

It is an object of the present invention to provide a method for producing a film comprising microfibrillated cellulose in an efficient way without negatively affecting the barrier properties of the film, which method further eliminates or alleviates at least some of the disadvantages of the prior art methods.

The invention is defined by the appended independent claims. Embodiments are set forth in the appended dependent claims and in the following description.

The present invention relates to a method for the production of a film comprising microfibrillated cellulose, wherein the method comprises the steps of: providing a suspension comprising between 70 weight-% to 100 weight-% of microfibrillated cellulose based on total dry weight, forming a fibrous web of said suspension, drying the web in a drying equipment wherein the web is at least partly dried at a drying rate above 75 kg($H_2O$)/$m^2$/h by use of hot air whereby a film is formed. It has surprisingly been found that it is possible to produce a MFC film with good barrier properties in an efficient way by drying the web at a drying rate above 75 kg($H_2O$)$m^2$/h by subjecting a fibrous web to hot air. Normally, the drying rate for MFC films are much lower leading to that the drying of a MFC film takes too long time.

The hot air used in the drying equipment preferably has a temperature of between 100-350° C. and is applied at a velocity of 20-100 m/s.

The web preferably is applied to a support before it is dried in the drying equipment. The web is dried in the drying equipment on said support. The support is preferably a metal belt and it is preferred that the support is heated to a temperature between 60-150° C. before the web is applied to the support. The support may also be part of the drying equipment. It has surprisingly been found that the drying rate of the film is improved by subjecting the web to a heated support prior to the drying.

The fibrous web is preferably formed by adding the suspension onto a substrate. The fibrous web is preferable added by casting the suspension onto the substrate. It may also be possible to add the suspension by printing the suspension onto the substrate. The substrate may be a paper or paperboard substrate thus forming a paperboard or paper substrate coated with a MFC film. The substrate may also be a polymer or metal substrate. It is thus possible to add a MFC film onto a polymer film. The casted fibrous web can then be dried and optionally peeled off from the substrate. If a multilayer structure comprising the fibrous web and the substrate is produced, the added fibrous web is not peeled off from the substrate. The peeled off fibrous web or the multilayer structure comprising the fibrous web and the substrate is thereafter dried in the drying equipment according to the present invention.

The substrate may also be a porous wire. The fibrous web may be formed by subjecting the suspension onto a wire. The formed fibrous web may then be removed from the wire and thereafter dried in the drying equipment, preferably on the support.

It may be possible to apply pressure to the fibrous web prior and/or during the drying of the web in the drying equipment. The pressure is preferably above 5 kN/m. The pressure may be applied in order to ensure that the fibrous web is in contact with the support before and/or during the drying of the web in the drying equipment.

The fibrous web preferably has a dry content of 10-40 weight-% before being dried in the drying equipment. The web formed may thus be dried or dewatered in any conventional way, e.g. by pressing or conventional cylinder drying, by using vacuum and/or by the use of hot air, in order for it to have the appropriate dry content before it is being conducted to the drying equipment.

The microfibrillated cellulose of the suspension preferably has a Shopper-Riegler (SR) value above 90.

The film preferably has an Oxygen Transmission Rate (OTR) value (23° C., 50% RH) below 400 cc/$m^2$/24 h according to ASTM D-3985 after drying. Thus, the oxygen barrier property of the film is still very good.

The drying equipment is preferably an impingement drying equipment.

The present invention also relates to a film comprising microfibrillated cellulose obtained by the method described above. The film preferably has a gram mage below 40 gsm, preferably below 30 gsm and a density above 700 kg/m$^3$. The film preferably has an Oxygen Transmission Rate (OTR) value (23° C., 50% RH) below 400 cc/m$^2$/24 h according to ASTM D-3985. The film according to the present invention is preferably a thin translucent or transparent film, with a high density, high smoothness and good barrier properties.

The present invention also relates to a paper or paperboard substrate obtained by the method described above where the fibrous web is formed on a paper or paperboard support.

DETAILED DESCRIPTION

Figure 1:
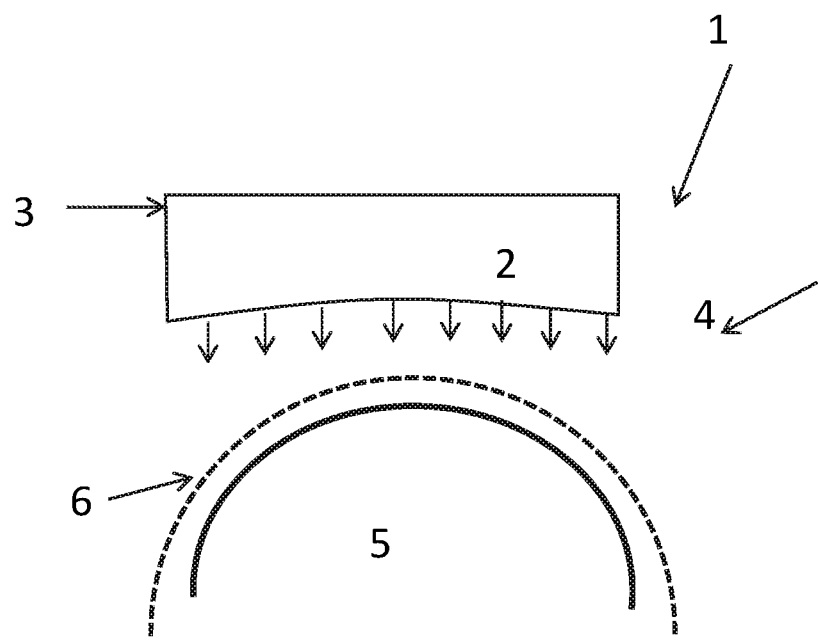
FIG. 1: Shows a schematic overview of the method according to the invention

It has surprisingly been found that it is possible to dry a MFC film at a drying rate above 75 kg(H$_2$O)/m$^2$/h, preferably above 100 kg(H$_2$O)/m$^2$/h by subjecting a fibrous web comprising high amounts of microfibrillated cellulose to hot air without negatively affecting the barrier properties of the film. It was expected that the use of hot air at high drying rates would bring the water in the film to boil and due to the high density of the MFC film it was expected that the water would boil inside the film and destroy the barrier properties of the film, i.e. it would not be possible for the boiling water to "escape" from inside the MFC film without breaking the smooth surface of the film. The drying rate is determined by measuring the dry content of the film before and after drying, the time and area of the film being dried. The suspension comprises between 70 weight-% to 100 weight-% of microfibrillated cellulose based on total dry weight. Thus, the MFC film produced comprises high amount of MFC, preferably between 70-100% by weight of MFC, this relates to the amount of MFC in the film per se before eventual coating layers have been added.

With film is meant a thin substrate with good gas, aroma or grease or oil barrier properties, preferably oxygen barrier properties. The film preferably has a basis weight of less than 40 g/m$^2$ and a density in the range from 700-1400 kg/m$^3$. The oxygen transmission rate (OTR) value of a film having a gram mage of 30 g/m$^2$ at 23° C. and at a relative humidity of 50%, is preferably below 30 cc/m$^2$/24 h according to ASTM D-3985.

The hot air used in the drying equipment preferably has a temperature of between 100-350° C., preferably between 150-250° C. and is applied at a velocity of 20-100 m/s, preferably between 30-60 m/s.

The web preferably is applied to a support before it is dried in the drying equipment and the web is thereafter conducted through the drying equipment on said support. The support is preferably a metal belt and it is preferred that the support is heated to a temperature between 60-150° C., preferably between 60-100° C. before the web is applied to the support. It has surprisingly been found that the drying rate of the film is improved by subjecting the web to a heated support prior to the drying. The temperature of the web conducted to the support is preferably at room temperature, i.e. there is a temperature difference between conducted the fibrous web and the heated support. The support may also be part of the drying equipment, e.g. a belt or roll of the drying equipment.

The fibrous web is preferably formed by adding the suspension, preferably by casting the suspension, onto a substrate. The substrate may be a paper or paperboard substrate thus forming a paperboard or paper substrate coated with the MFC film. The substrate may also be a polymer or metal substrate. The casted fibrous web can then be dried in any conventional manner and thereafter peeled off from the substrate. The peeled off fibrous web is thereafter dried in the drying equipment according to the present invention. It may also be possible that the substrate and the support is the same, i.e. meaning that the suspension is casted directly onto the support which thereafter is dried in the drying equipment.

The substrate may also be a porous wire, preferably a wire in a paper or paperboard machine. It is thus possible to apply the method in the wet end of a paper or paperboard machine. The fibrous web may be formed by subjecting the suspension onto a wire, preferably on a wire in the wet end of a paper or paperboard machine. The formed fibrous web may then be removed from the wire and thereafter dried in the drying equipment, preferably on the support. With paper or paperboard machine is meant any kind of paper making machine known to a person skilled in the art used for making paper, paperboard, tissue or any similar products.

It may be possible to apply pressure to the fibrous web prior and/or during the drying of the web in the drying equipment. The pressure applied is preferably above 5 kN/m. The pressure may be applied in order to ensure that the fibrous web is in contact with the support before and/or during the drying of the web in the drying equipment avoiding that a gap is formed between the web and the support which might lead to that the water removed in the drying equipment will boil in the gap thus destroying the barrier properties of the film. The pressure may be applied by any conventional manner, e.g. by a cylinder.

The fibrous web preferably has a dry content of 10-40 weight-% before being dried in the drying equipment. The web formed may thus be dried or dewatered in any conventional way, e.g. by pressing or conventional cylinder drying, by using vacuum and/or by the use of hot air, in order for it to have the appropriate dry content before it is being conducted to the drying equipment. The dry content of the MFC film after drying in the drying equipment is preferably above 70% by weight, preferably above 80% by weight and even more preferably between 85-97% by weight. The produced MFC film may also be dried in additional drying steps after being dried in the drying equipment. Any conventional drying equipment may be used.

Besides MFC, the film may also comprise longer cellulosic fibers, either hardwood or softwood fibers, preferably kraft pulp softwood fibers. The film may also comprise other additives, such as pigments, carboxymethylcelluose (CMC), retention chemicals, starch etc.

The microfibrillated cellulose of the suspension preferably has a Shopper-Riegler (SR) value above 90, preferably above 95.

The drying equipment is preferably an impingement drying equipment. It is surprising that it is possible to dry a MFC film having barrier properties in an impingement drying that uses hot temperatures and high drying rates.

The present invention also relates to a film comprising microfibrillated cellulose obtained by the method described above. The film preferably has a grammage below 40 gsm, preferably below 30 gsm and a density above 700 kg/m$^3$. The film preferably has an Oxygen Transmission Rate (OTR) value (23° C., 50% RH) below 400 cc/m$^2$/24 h, more preferably below 100 cc/m$^2$/24 h according to ASTM D-3985. The film according to the present invention is preferably a thin translucent or transparent film, with a high density, high smoothness and good barrier properties.

The present invention also relates to a paper or paperboard substrate obtained by the method described above where the fibrous web is formed on a paper or paperboard support. It is thus possible to produce a paper or paperboard product coating with a MFC film with good barrier properties in a very efficient way.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hem icellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hem icelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

The fibrous suspension may also comprise a wet strength agent, i.e. a wet strength agent may be added to the suspension. It has surprisingly been found that it is possible to dry a MFC film comprising a wet strength agent with a drying equipment at high temperatures. Wet strength chemicals improves the strength properties of the web and thus of the film by crosslinking the microfibrillated fibers and it was surprising that it was possible to produce a dry film comprising wet strength agents and MFC by the use of a drying equipment at high temperatures. Different wet strength agents can be added such as ureaformaldehyde (UH), melamineformaldehyde (MF), polyamide-epichlorohydrin (PEA), glyoxal and/or polyacrylamide (PAM), or mixtures thereof.

The suspension may also comprise a crosslinking agent. By adding a crosslinking agent to the suspension the film will have improved barrier properties at high relative humidity (RH) values. Different crosslinking agents can be added such as citric acid, polyisocyanate, metal ions preferably alkaline earth metal ions, anionic-cationic complex and/or polyelectrolyte complex.

Normally when adding a wet strength agent or a crosslinking agent to a furnish to produce e.g. a paper, the paper needs to be cured in order for the wet strength agent or crosslinking agent to reach its full strength potential. When producing films the drying temperature is normally very low (to reduce over drying) and thus the film then needs to be cured in order for wet strength agent or crosslinking agent to fulfil its full potential. By the present invention there is no need to cure the film after drying since the wet strength agent or crosslinking agent will be cured during the drying of the film. The wet strength agent or crosslinking agent can be added to the furnish or added onto the wet film e.g. to the film on the wire or in a surface treatment step of the film.

The MFC film according to the present invention may be used as bag in boxes when packaging dry food such as cereals, as a wrapping substrate, as a laminate material in paper, paperboard or plastics and/or as a substrate for disposable electronics.

Example 1

FIG. 1 shows a schematic figure over the method according to the present invention.

The drying equipment (1) according to one embodiment of the invention comprises an impingement hood (2) to which hot air (3) is added. The hot air is then blown through multiple nozzles (4) at a certain temperature and velocity. The drying equipment (1) further comprises a support in form of a heated plate (5) and the fibrous web (6) is conducted through the drying equipment on the plate so that the hot air is blown onto the fibrous web forming a MFC film.

Example 2

The drying rate when different temperatures of the air blown onto a fibrous web in a drying equipment was investigated.

A fibrous suspension comprising 70 wt-% based on total dry weight of MFC was casted onto a metal belt at a solid content of 4%. The metal belt was heated to a specific temperature before casting, Belt 110° C. means that the metal belt had a temperature of 110° C. towards the end of the drying. The same goes for the sample with the Belt 120° C. and Belt 130° C. respectively. The MFC film in Belt 110° C., 120° C. and 130° C. was only dried by the heated metal melt and can be used as reference samples. The casted web was thereafter dried until it was easy to peel off, which was to a dry content of about 90% by weight.

Three samples were also dried in an impingement dryer after casting on the heated belt. These samples were made by casting the MFC suspension to a heated metal belt (all samples were casted on a belt with a temperature of 110° C.) followed by drying in an impingement dryer where air with different temperature was used. The air speed of the air was 30 m/s for all samples and the temperature of the air was 20° C., 150° C. or 300° C.

Figure 2:
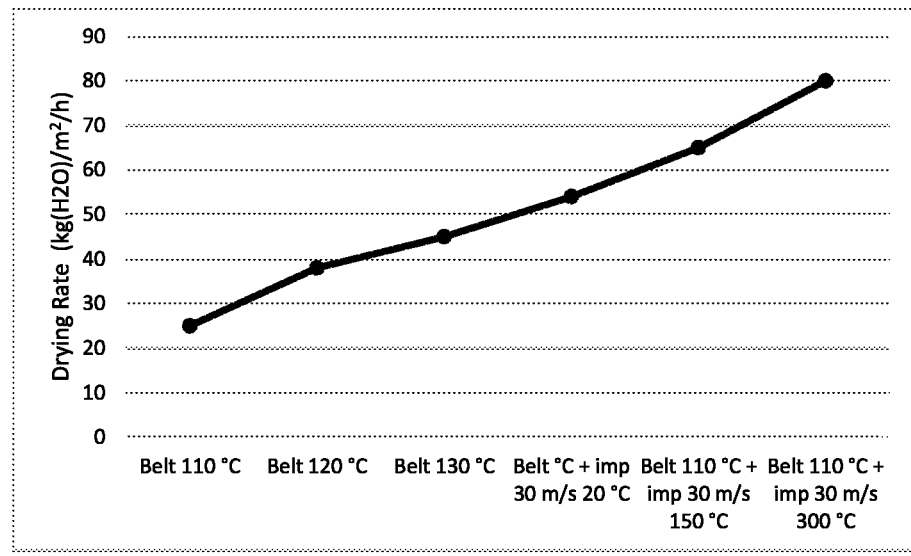
FIG. 2: Shows the drying rate for a MFC film at different drying temperatures

The results of the drying rate for all 6 samples can be seen in FIG. 2. The drying rate increased when the films were dried in an impingement drying equipment using hot air.

The oxygen transmission rate (OTR) value of the MFC films dried with impingement drying was measured according to ASTM D-3985. The results of the OTR values is shown in Table 1.

TABLE 1

OTR values

| Sample | OTR value (cc/m$^2$/24 h) |
|---|---|
| Belt 110° C. + imp 30 m/s 20° C. | 1.7 |
| Belt 110° C. + imp 30 m/s 150° C. | 1.4 |
| Belt 110° C. + imp 30 m/s 300° C. | 0.5 |

Thus it is clear that all MFC films dried in the impingement dryer show very good OTR values and it is thus possible to create a good barrier film even when the film is dried at high drying rates.

Example 3

A suspension comprising 70 wt-% based on total dry weight of microfibrillated cellulose at a consistency of 4 wt-% was casted onto a heated metal belt to form a fibrous web. The fibrous web was thereafter conducted through an impingement dryer on the same metal belt. The web was dried in the impingement dryer where hot air was blown towards the casted fibrous web. Different temperatures of the metal belt and the furnish before casting were tested in order see how it affected the drying time of the web.

The drying time was thereafter measured as the time until the film has a dry content of at least 90% by weight. The drying rate during the test was 80 kg(H2O)/m$^2$/h.

Figure 3:
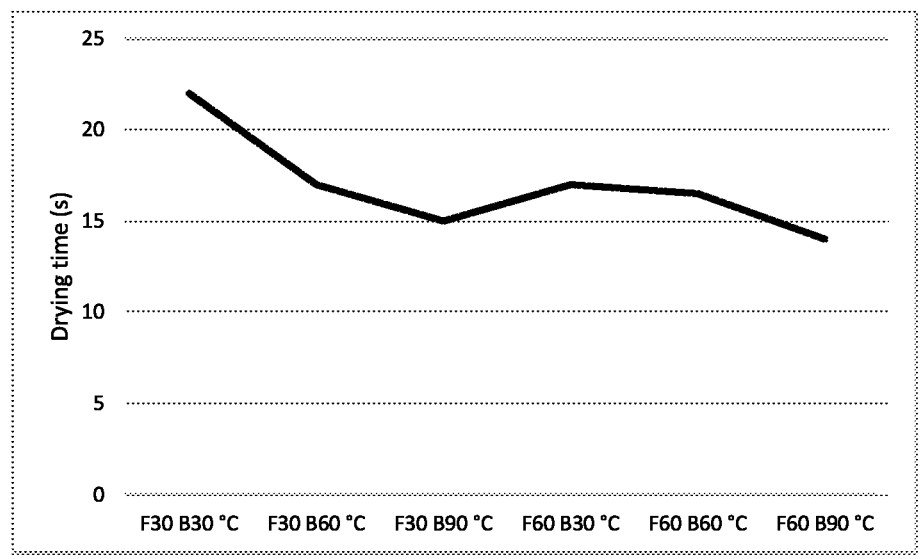
FIG. 3: Shows the drying time for a MFC film at different drying temperatures

The results from the test is shown in FIG. 3. F30 means that the furnish had a temperature of 30° C., B30° means that the belt had a temperature of 30° C. and the same goes for the other samples. It is evident from FIG. 3 that the drying time decreased for the MFC film when the belt had a very high temperature during casting and before impingement drying.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for the production of a film comprising microfibrillated cellulose, wherein the method comprises the steps of:
    providing a suspension comprising between 70 weight-% to 100 weight-% of microfibrillated cellulose based on total dry weight,
    forming a fibrous web of said suspension,
    drying the web in a drying equipment wherein the web is at least partly dried at a drying rate above 75 kg(H$_2$O)/m$^2$/h by use of hot air whereby a film is formed.

2. The method as claimed in claim 1, wherein the air has a temperature of 100-350° C. and is applied at a velocity of 20-100 m/s.

3. The method according of claim 1 wherein the web is applied to a support and thereafter conducted through the drying equipment on said support.

4. The method according to claim 3 wherein the support is a metal belt.

5. The method according to claim 3 wherein the support is heated to a temperature between 60-150° C. before the web is applied to the support.

6. The method according to claim 1 wherein the fibrous web is formed by adding the suspension onto a substrate.

7. The method according to claim 6 wherein the fibrous web is formed by casting the suspension onto the substrate.

8. The method according to claim 6 wherein the substrate is a paper or paperboard substrate.

9. The method according to claim 6 wherein the substrate is a polymer or metal substrate.

10. The method according to claim 1 wherein the fibrous web is formed by subjecting the suspension onto a wire.

11. The method according to claim 1 wherein pressure is applied to the fibrous web prior and/or during the drying of the web in the drying equipment.

12. The method according to claim 1 wherein the fibrous web has a dry content of 10-40 weight-% before being dried in the drying equipment.

13. The method according to claim 1 wherein the microfibrillated cellulose of the suspension has a Shopper-Riegler (SR) value above 90.

14. The method according to claim 1 wherein the film has an Oxygen Transmission Rate (OTR) value (23° C., 50% RH) below 400 cc/m$^2$/24 h according to ASTM D-3985 after drying.

15. The method according to claim 1 wherein the drying equipment is an impingement drying equipment.

* * * * *